(12) United States Patent
Susnjara

(10) Patent No.: US 12,214,528 B1
(45) Date of Patent: Feb. 4, 2025

(54) METHODS AND SYSTEMS FOR SUPPORT STRUCTURES IN CUT PARTS

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 54 days.

(21) Appl. No.: 18/473,375

(22) Filed: Sep. 25, 2023

(51) Int. Cl.
| | |
|---|---|
| *B29C 64/386* | (2017.01) |
| *B29C 33/38* | (2006.01) |
| *B29C 64/188* | (2017.01) |
| *B33Y 10/00* | (2015.01) |
| *B33Y 40/20* | (2020.01) |
| *B33Y 50/00* | (2015.01) |
| *B33Y 80/00* | (2015.01) |
| *B29L 31/00* | (2006.01) |

(52) U.S. Cl.
CPC ........ *B29C 33/3842* (2013.01); *B29C 64/188* (2017.08); *B29C 64/386* (2017.08); *B33Y 40/20* (2020.01); *B33Y 80/00* (2014.12); *B29L 2031/757* (2013.01); *B33Y 10/00* (2014.12); *B33Y 50/00* (2014.12)

(58) Field of Classification Search
CPC . B29C 33/3842; B29C 64/188; B29C 64/386; B33Y 40/20; B33Y 80/00; B33Y 10/00; B33Y 50/00; B29L 2031/757
See application file for complete search history.

(56) References Cited

U.S. PATENT DOCUMENTS

| | | | |
|---|---|---|---|
| 2011/0189440 A1* | 8/2011 | Appleby ................. | B29C 33/38 523/435 |
| 2014/0135193 A1* | 5/2014 | Albarran-Torres ..... | A47F 5/116 493/390 |

* cited by examiner

*Primary Examiner* — Yuhui R Pan
(74) *Attorney, Agent, or Firm* — Bookoff McAndrews, PLLC

(57) ABSTRACT

A method of manufacturing a part includes removing material with a cutting machine to form a plurality of segments, at least two of the segments including an anchoring structure, connecting two or more segments to form a first layer, and connecting two or more additional segments to form a second layer. The method also includes connecting the first layer to the second layer and connecting a support structure directly to two of the anchoring structures.

20 Claims, 10 Drawing Sheets

METHODS AND SYSTEMS FOR SUPPORT STRUCTURES IN CUT PARTS

TECHNICAL FIELD

Aspects of the present disclosure relate to systems and methods for fabricating components. In some instances, aspects of the present disclosure relate to systems and methods for fabricating components (such as, e.g., patterns, molds, and similar products, etc.) via techniques or processes that have similarities with 3D printing processes involving layering. These techniques or processes may enable, in at least some embodiments, production of lower-cost molds or tooling without the use of a 3D printer.

BACKGROUND

Additive manufacturing techniques and processes generally involve the buildup of one or more materials to make a net or near net shape (NNS) object, in contrast to subtractive manufacturing methods. Although "additive manufacturing" is an industry standard term (ASTM F2792), additive manufacturing encompasses various manufacturing and prototyping techniques known under a variety of names, including freeform fabrication, 3D printing, rapid prototyping/tooling, etc.

Some additive manufacturing techniques use large-scale 3D printers that are capable of fabricating very large parts, molds, patterns, etc. These parts can be produced from fiber-reinforced thermoplastic materials, for example. One method of producing these parts utilizes a polymer extruder which generates a bead of molten thermoplastic material, beads of this material being added in sequence to that the part is produced one layer at a time. These layers can be modified and/or flattened into wider beads during this additive process using devices such as tamping plates, rollers, or the like. Using these approaches, sometimes referred to as 3D printing, the part is made slightly larger than desired. After the part cools and hardens, it is machined to the final size and shape. The resulting part is generally a shell of a specific thickness and of the approximate size and shape desired.

Another type of additive manufacturing can be referred to as "cut layer" additive manufacturing. In some examples of cut layer additive manufacturing, pieces can be cut from porous material, stacked on top of one another, and attached together to create a part. In some cases, this part may be hollow, comprised of individual parts that are narrow beads that, when stacked together, create a shell or wall around the outside shape of the desired part. In some approaches, a shell or wall is built from a porous material and infused with a catalyzed thermoset liquid. The liquid cures to produce a rigid composite part reinforced with the porous material.

There are times, however, when it is desirable to produce a part from non-porous material such as metal (e.g., aluminum). Examples of potential applications for such a part include industrial molds and tooling, such as thermoforming molds, compression molds, and injection molds. In general, aluminum molds for applications such as compression or injection molds are not suitable for long-term production but can be desirable for prototyping and short run sample production, provided that the aluminum molds have a suitable cost and can be produced in an appropriate period of time.

One reason aluminum or other materials having desirable properties are not used for at least some applications, such as molds and tooling, is that these relatively large parts involve use of large blocks of material and significant time to remove (e.g., machine away) excess material to produce the desired shape, such as the cavity of a mold. This is especially true of large, deep parts where half the material, or more, may be removed to achieve the desired geometry for the final part.

Some parts, including tooling, might also benefit from structures including internal channels through which heated or cooled liquid can be circulated to control the temperature of the tool during operation. However, machining these channels in a solid block of material requires significant time and specialized equipment, further increasing build time and cost. Also, in some cases, it might not be possible to locate these channels in certain areas of the mold by machining into a solid block from the outside. This might make it impractical, or even impossible, to create channels in some locations of parts made via traditional additive manufacturing techniques.

In some examples of cut layer additive manufacturing, pieces can be cut from porous material, stacked on top of one another, and attached together to create a part. In cut layer additive manufacturing, sheets of material can be used, these sheets generally having a lower cost per a pound than a large block of the same material. Cut layer manufacturing may be beneficial by involving machined of less material to produce a final product as compared to other types of additive manufacturing. Also, cut layer manufacturing can provide the ability to form heating and/or cooling channels into cut sheets that could not be easily machined in a solid block of material.

One feature of some large 3D-printed additive structures is that they can include internal support structures that add rigidity and strength. These can be printed with the outer shell wall of the part as a single structure made from the same material. In the cut layer process, whether a porous or non-porous material is used, the part may be a hollow structure that could benefit from internal support. However, internal support structures might be difficult to incorporate in individual layers used in cut layer processes, especially layers formed by segments that are initially nested within one or more sheets of material. Therefore, it would be desirable to develop a method and device for attaching internal support structures to the part in cut layer processes of additive manufacturing.

SUMMARY

Aspects of the present disclosure relate to, among other things, methods and systems for fabricating components via layering techniques. Each of the aspects disclosed herein may include one or more of the features described in connection with any of the other disclosed aspects. One object of this disclosure is a process of creating anchor points internally (e.g., within a hollow interior) in a part, and throughout appropriate layer segments. These anchor points may be useful for attaching an internal support structure.

Some embodiments include adding at least one anchor point, also referred to herein as an anchoring structure, to one or more selected layers. These anchor points may include material which protrudes toward an inside of the part by a distance sufficient to facilitate the attachment of a separate structural element. By spanning structural elements between anchor points, and across the interior of the part, a support structure may be fabricated in a desired manner. This approach may provide a relatively simple and adaptable process for adding internal structures to hollow cut layer parts. This may allow the use of structure material that is lower cost, that is significantly more rigid, that is lighter weight, and/or that possesses desirable characteristics in addition or instead of cost, rigidity or weight. In particular, the structural support material, which may span across a pair of anchor points, may have characteristics that differ from those of the material from which the primary cut layer shell and anchor point are fabricated.

At least some embodiments may provide the ability to suspend or otherwise position support structures between layers at different levels inside the part. These and other aspects may be desirable, but difficult to implement in other additive manufacturing processes, such as printing or extrusion processes.

The disclosed process of creating anchor points on the internal surface of the part may include an option (e.g., a prompt) provided to a user via software or other programming for performing cut layer manufacturing. For example, at one or more points or stages in the design and/or manufacturing process, the software may generate a notification asking if a user wishes to create anchor points on the internal surface of the part. The user may input a request or a confirmation in the form of a "Yes" or other form, and subsequently identify one or more particular layers and/or one or more particular locations on each layer for locations of anchor points. The process of placing anchor points may be an automated process achieved with software to minimize, and in some embodiments eliminate, the need for programming to be performed by the user.

In one aspect, a method of manufacturing a part may include removing material with a machining apparatus to form a plurality of segments, at least two of the segments including an anchoring structure, connecting two or more segments to form a first layer, and connecting two or more additional segments to form a second layer. The method may also include connecting the first layer to the second layer and connecting a support structure to two of the anchoring structures.

In another aspect, a part formed by additive manufacturing may include a first segment forming a portion of a first layer, a second segment forming a portion of the first layer, the second segment forming a joint with the first layer, and a third segment forming a portion of a second layer. The part may further include anchoring structures, including at least one anchoring structure formed on at least one of the first segment, the second segment, or the third segment, and a support structure fixed to a plurality of the anchoring structures.

In yet another aspect, a computer-implemented additive manufacturing method may include receiving an electronic representation of a part with a control system, the part having a plurality of layers, determining that anchoring structures will be formed in one or more of the layers, and identifying the one or more layers that will include the anchoring structures. The method may also include determining locations for the anchoring structures within the one or more layers and generating instructions for forming the one or more layers including anchoring structures with a machining apparatus.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via layering techniques. Specifically, the methods and apparatus described herein may include processes for creating anchor points in a part and within one or more layer segments, these anchor points being configured for attaching an internal support structure.

Some aspects of the present disclosure may provide an alternative to machining a part, such as a mold, from a solid block of material. For example, in some aspects a mold blank is assembled by stacking parts. These parts may be cut from one or more sheets of the material. The one or more sheets of material may be formed from a porous material. As an example, the porous material is density fiberboard (MDF). In some aspects, one or more of the sheets may be formed of a solid material, such as aluminum. As understood, while a mold is discussed herein, as understood, the part may be a tool or another part or product.

In some aspects, a layered mold blank may be produced according to the process described herein. This initial blank may have a size and shape that is approximately the same as the size and shape desired for the final mold. The layered mold blank may, once assembled, be machined to the desired final size and shape. This may produce a part that is similar in structure to parts manufactured by other additive manufacturing process, including parts that are built in layers (e.g., by a 3D-printer).

Figure 1:
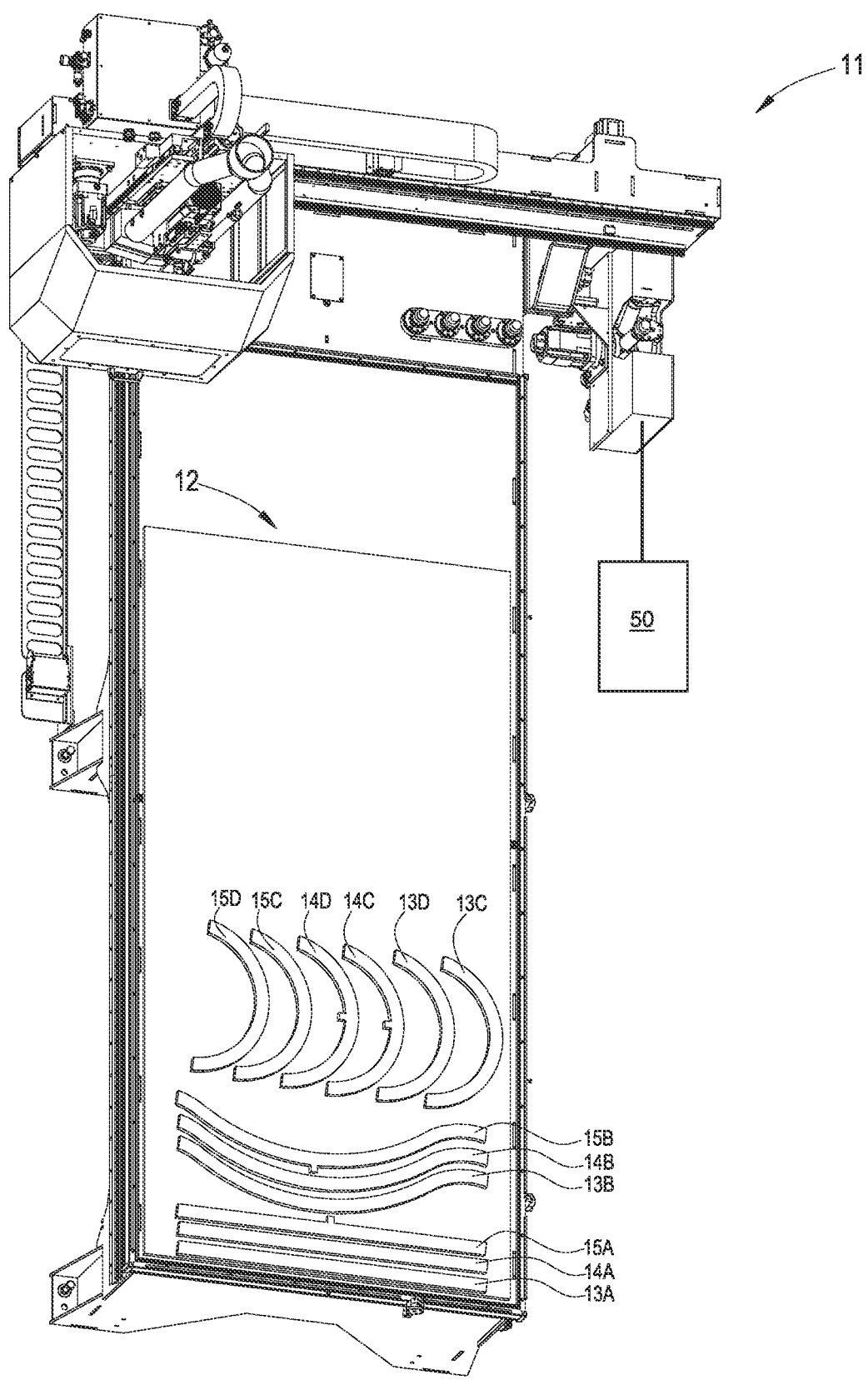
FIG. 1 is a top perspective view of an exemplary machine configured to rout sheets of material, according to aspects of the present disclosure.

As shown in FIG. 1, a machining apparatus or cutting machine 11 (e.g., a CNC router) or other material removing machine may operate to remove material and form cut layers from sheets of material 12. A controller 50 may be incorporated in machine 11 and/or may be part of a system for manufacturing a part, as described herein. Controller 50 may be configured to generate commands to cause machine 11 to remove material from a sheet 12, as described herein. The layers formed with machine 11 may be assembled together to form a part, and therefore not applied to each other in a printing process (e.g., layers are formed without successively depositing layers of material with a nozzle). An exemplary assembly process is described below.

In some aspects, a layer may be formed with a plurality of individual layer segments. However, at least some parts may include one or more layers formed by a single segment. FIG. 1 illustrates exemplary layer segments 13A-13D, layer segments 14A-14D, and layer segments 15A-15D. The exemplary shapes shown in FIG. 1 include straight bars or walls formed by segments 13A, 14A, and 15A, asymmetric curved portions formed by segments 13B, 14B, and 15B, and semicircular or arc-shaped portions formed by segments 13C, 13D, 14C, 14D, 15C, and 15D.

Figure 2A:
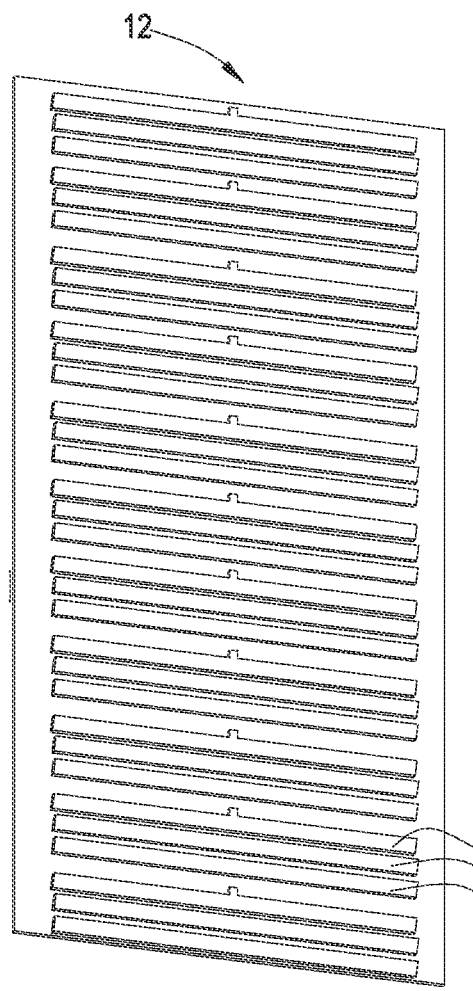
FIGS. 2A-2C are top perspective views of exemplary layer segments nested in sheets of material.
Figure 2B:
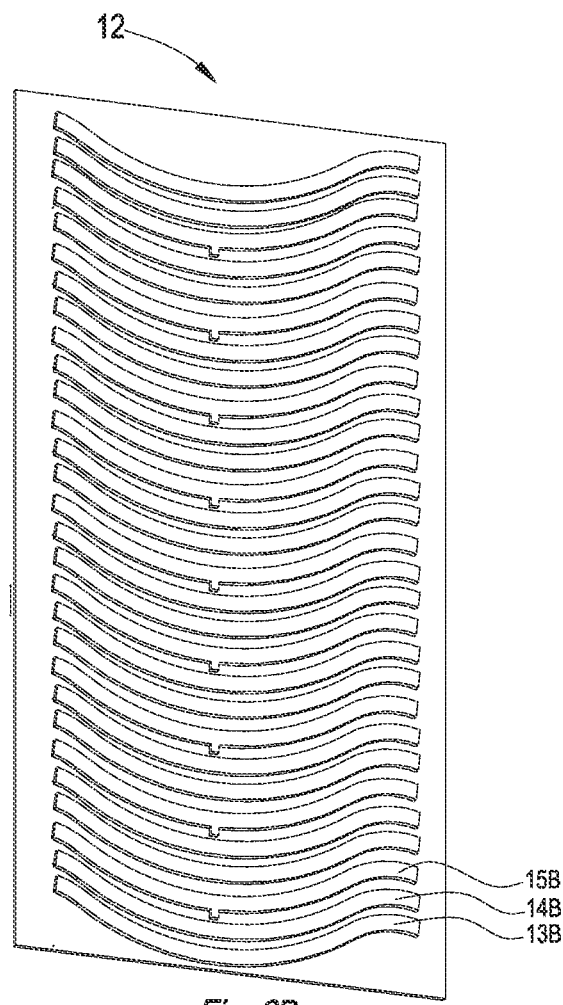
Figure 2C:
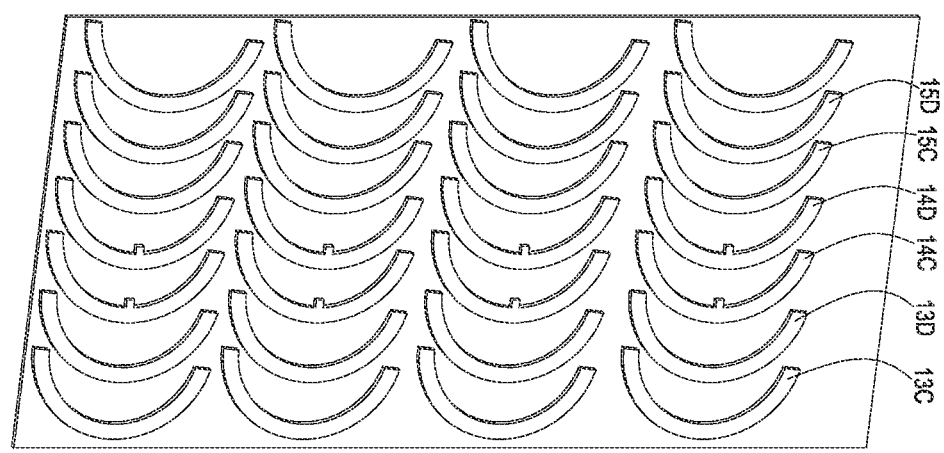

FIGS. 2A-2C illustrate example sheets of material 12 having an increased number of layer segments as compared the example depicted in FIG. 1. As shown in FIGS. 2A-2C, layer segments 13A-13D, 14A-14D, and 15A-15D may be nested within other segments (e.g., plural segments with one or more parallel edges) on sheets of material 12. Nesting layer segments may, in at least some embodiments, improve yield when using a cutting machine 11, such as a CNC router, to separate the segments from one or more sheets of material 12. These segments may be useful for constructing a mold or other part.

Figure 3A:
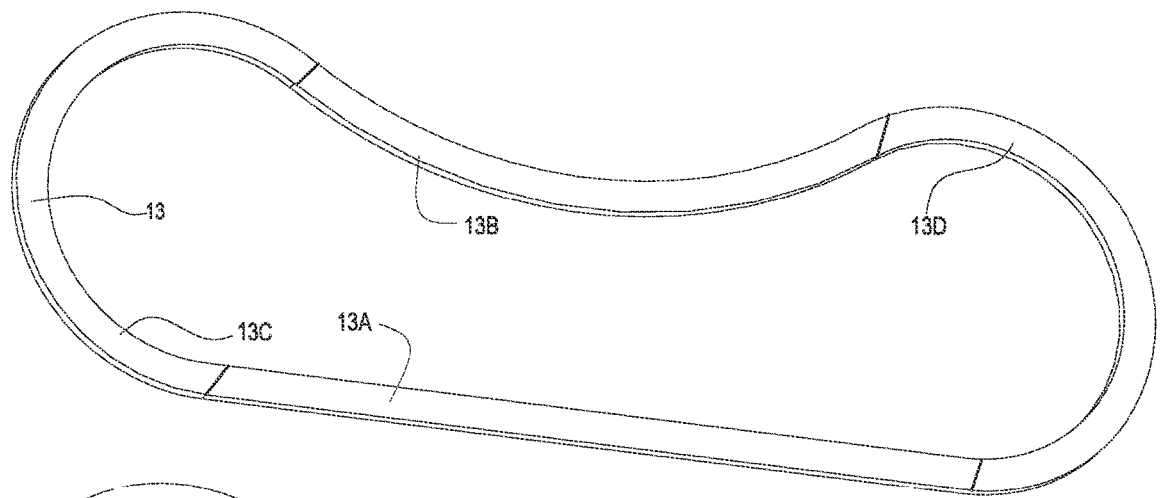
FIGS. 3A-3C are a top views of three exemplary layers comprised of layer segments used to create a mold and/or other part.
Figure 3B:
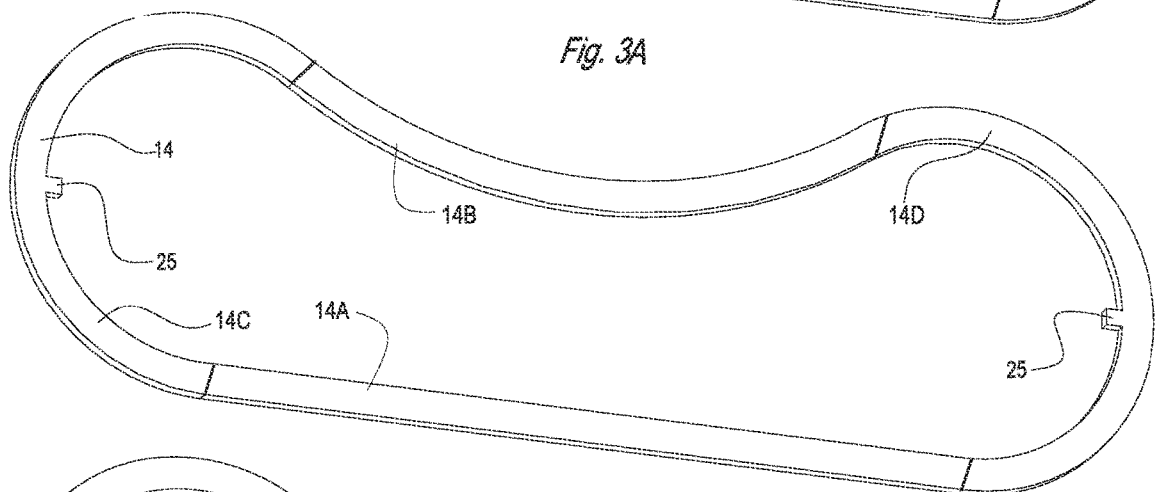
Figure 3C:
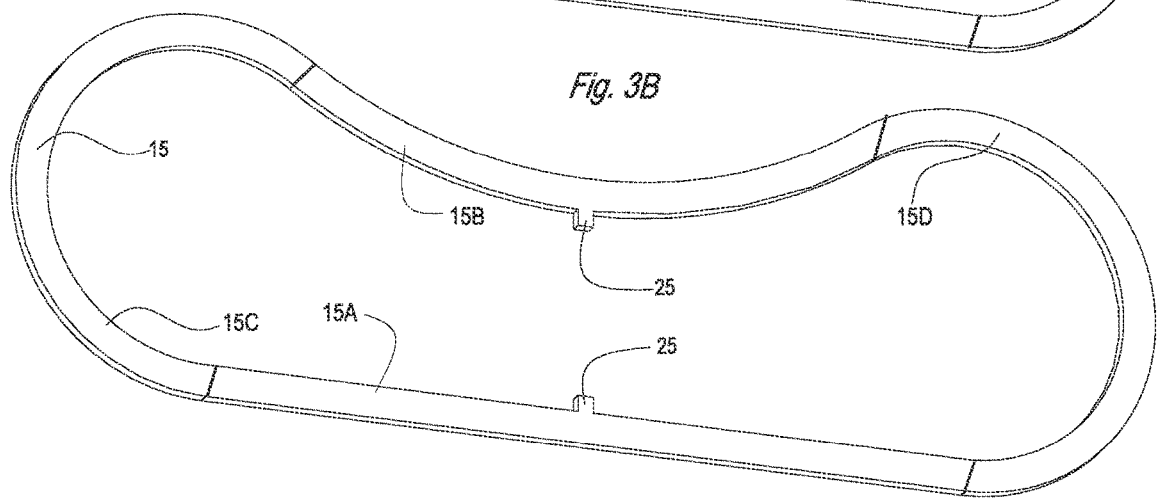

FIGS. 3A-3C illustrate three exemplary layers 13, 14, and 15. Layer 14 includes anchor points 25, or anchoring tabs, at opposite ends of layer 14. These anchor points 25 are placed so as to face each other in a direction that extends through an entire internal length of layer 14. Layer 15 includes additional anchor points 25 at opposite ends of layer 15. Anchor points 25 of layer 15 face each other in a direction that extends through an entire internal width of layer 15, this width being less than the length of layer 15. Layer 13 is an example of a layer that is free of anchor points 25.

In some aspects, layer 13 is formed by layer segments 13A, 13B, 13C, and 13D. Layer 14 of FIG. 3B includes segments 14A, 14B, 14C, and 14D, with anchor points 25 being present on segments 14C and 14D. Exemplary layer 15 of FIG. 3C includes segments 15A, 15B, 15C, and 15D, with anchor points 25 present on segments 15A and 15B. In some aspects, while layers 13, 14, and 15 are not formed by 3D printing, each of layers 13, 14, and 15 may have a shape that is substantially the same or the same as layers formed by a 3D printing process (e.g., for producing a mold).

Figure 4:
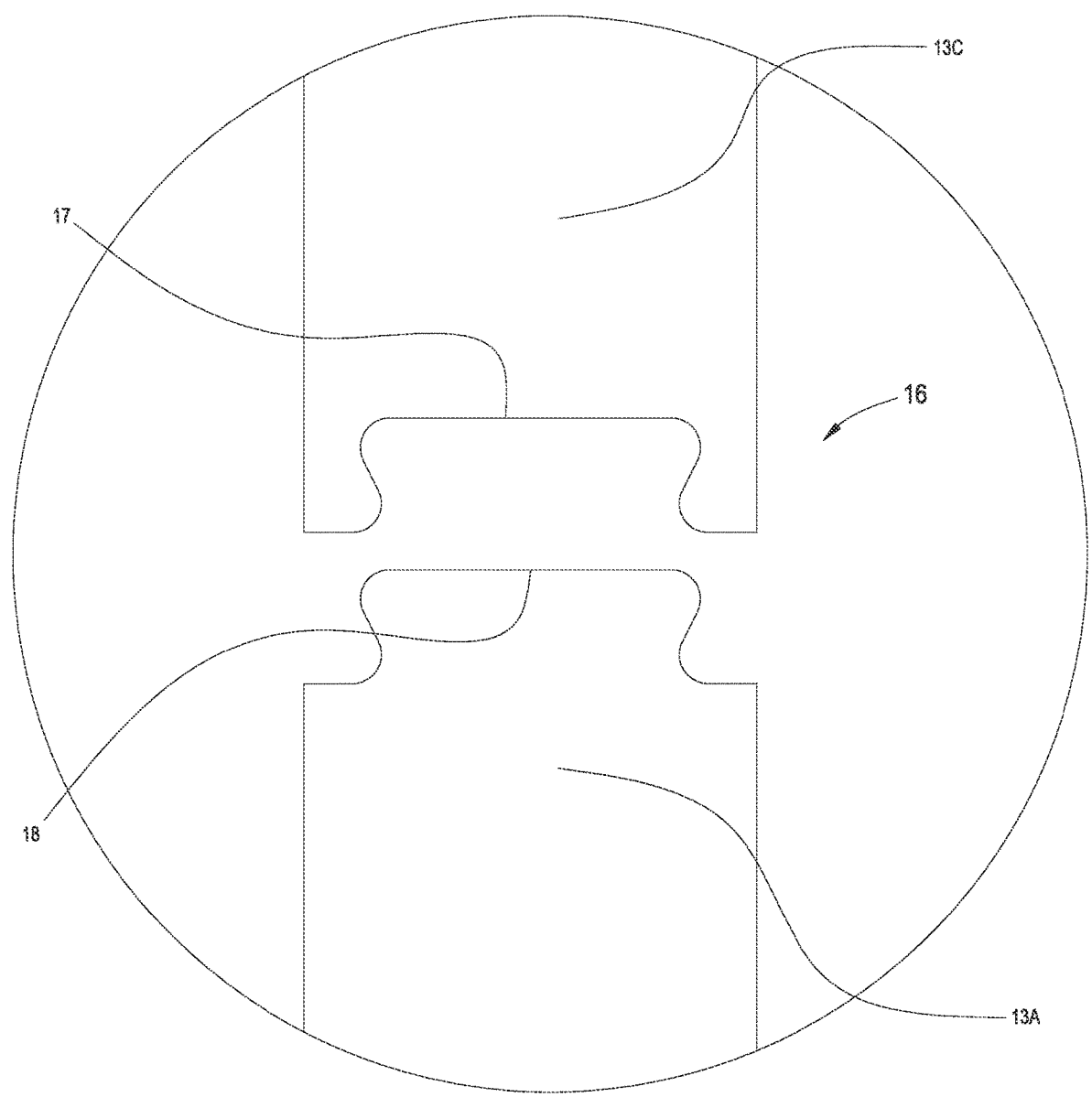
FIG. 4 is an enlarged top view of an exemplary joint configured to be machined into the ends of the layer segments to use for connecting the layer segments together.

FIG. 4 is a top view of two exemplary segments 13A and 13C showing a mechanism for joining these segments 13A and 13C such that the segments abut each other at a joint 16. In the embodiment illustrated in FIG. 4, joint 16 is a joint with a puzzle piece shape. Joint 16 may join layer segments 13A and 13C with a female shape or recess 17 and male shape or protrusion 18, these shapes matching each other in a manner that is analogous to puzzle pieces.

As shown in FIG. 4, the protruding male shape 18 may have a widened terminal end that extends from segment 13A by a narrowed neck portion. While one example is shown in FIG. 4, other interlocking shapes are possible. In some aspects, the shape of joint 16 may allow the two segments 13A and 13C to be joined by applying force along a stacking direction, while the segments resist separation in a direction perpendicular to the stacking direction (e.g., a vertical direction in FIG. 4).

Figure 5:
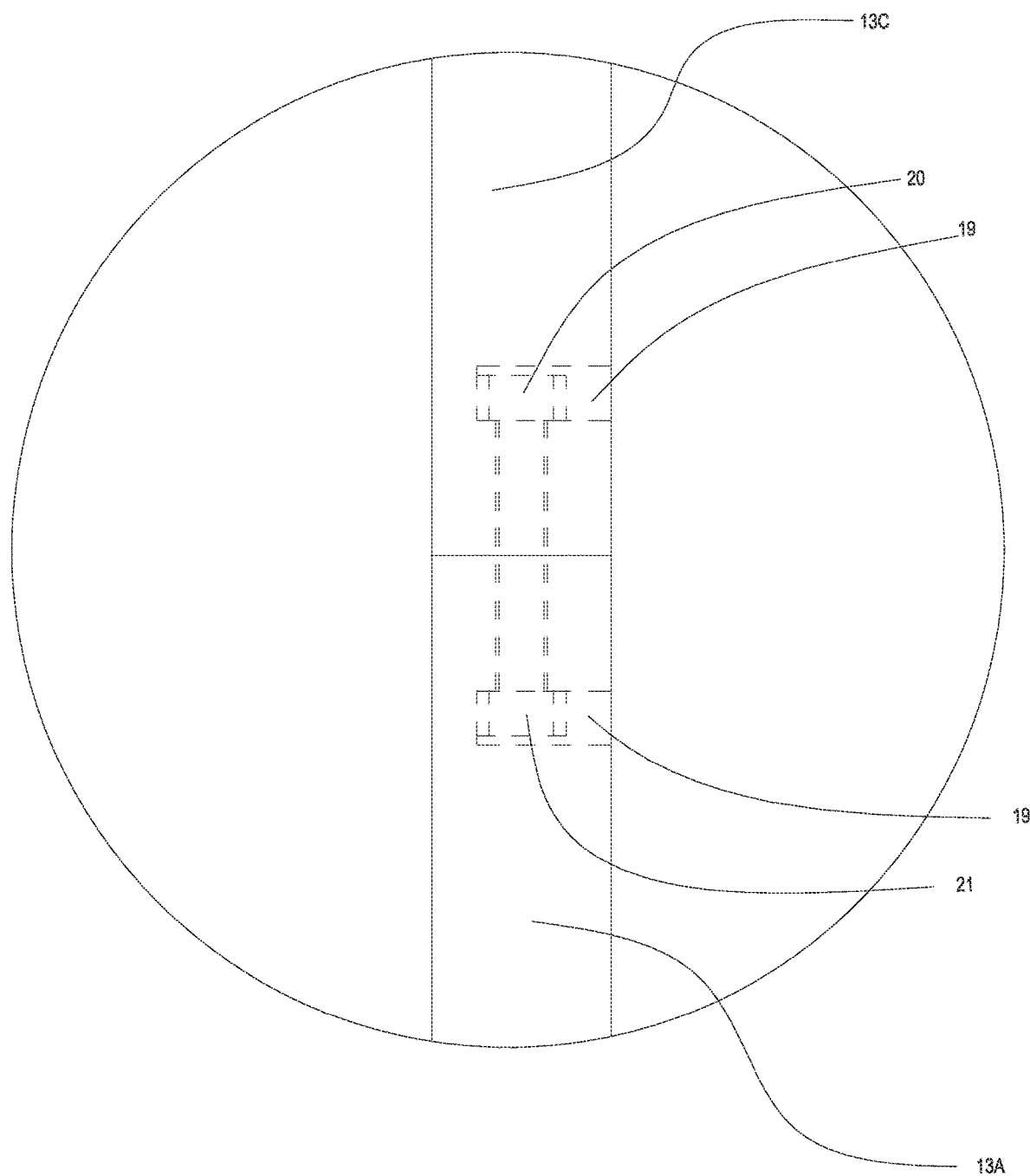
FIG. 5 is an enlarged side view of exemplary layer segments connected with a mechanical fastener.

FIG. 5 is a side view of segments 13A and 13C according to another embodiment. FIG. 5 shows an exemplary mechanical device in which segments 13A and 13C are fastened together.

Each segment (e.g., segments 13A and 13C) may include a slot 19 that is machined, or otherwise formed, in the side of the respective segment 13A and 13C. A relatively small bolt 20 and nut 21 may be placed within slots 19 and tightened to lock segments 13A and 13C together. While a bolt 20 with an enlarged head and a nut 21 are shown in FIG. 5, other types of fasteners may be used.

Figure 6:
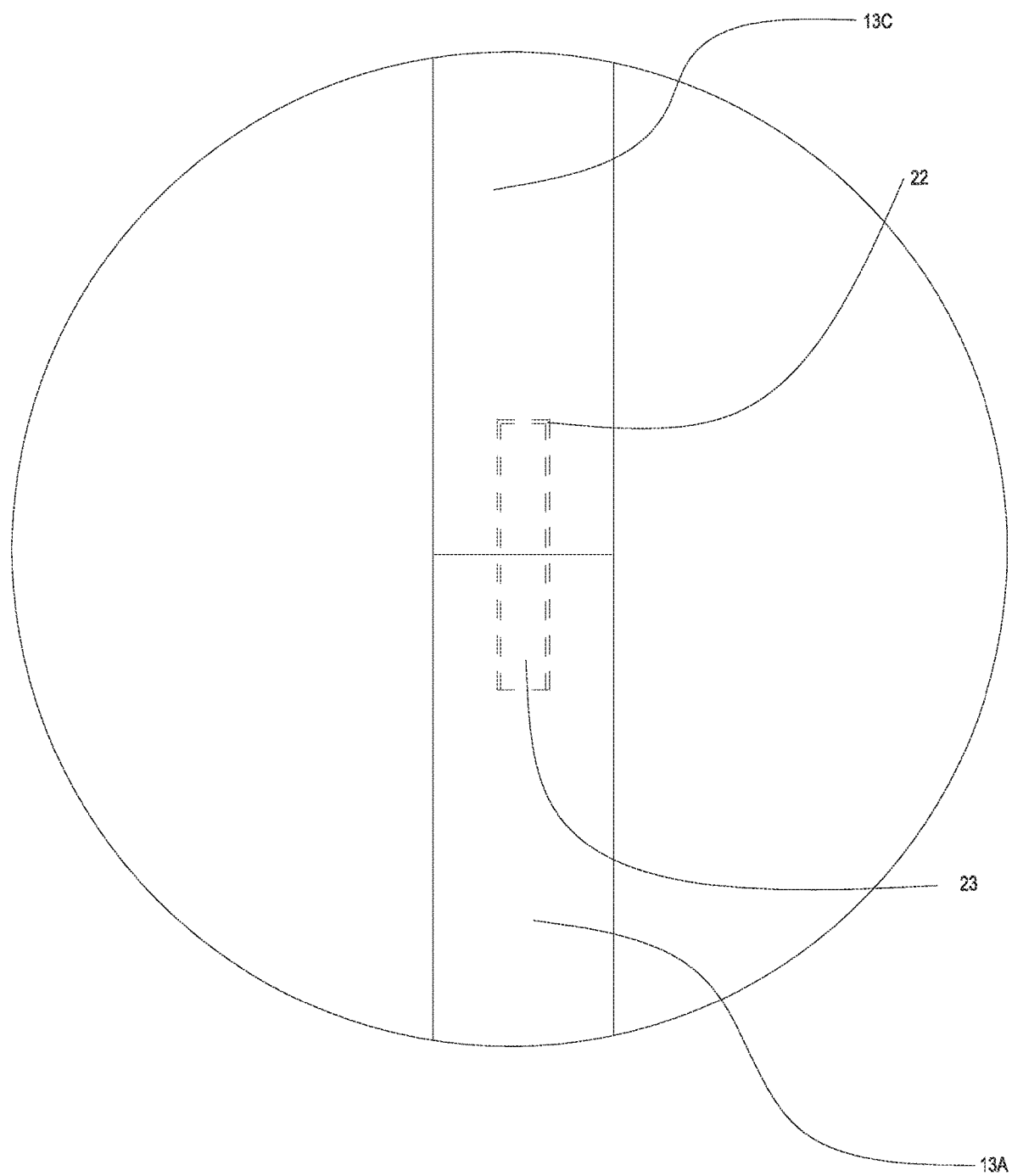
FIG. 6 is an enlarged side view of exemplary layer segments connected using dowels and adhesive.

In some embodiments, segments 13A and 13C may be secured together with dowel pins and, if desired, an adhesive. With reference to FIG. 6, a hole 22 may be machined in respective ends of each layer segment 13A and 13C. Once these holes 22 are formed, a dowel 23 may inserted through a pair of aligned holes 22, alone or with an adhesive.

As described herein, there are multiple types of structures that may be used for joining layer segments together. While some example embodiments have been described individually, a part may include any combination of these structures. Similarly, parts formed according to the present disclosure may be joined together by one or more mechanisms that join together the individual layers. Each layer, such as example layers 13-15 described above, can include a plurality of these joints including any combination of the joints described with respect to FIGS. 4-6.

Figure 7A:
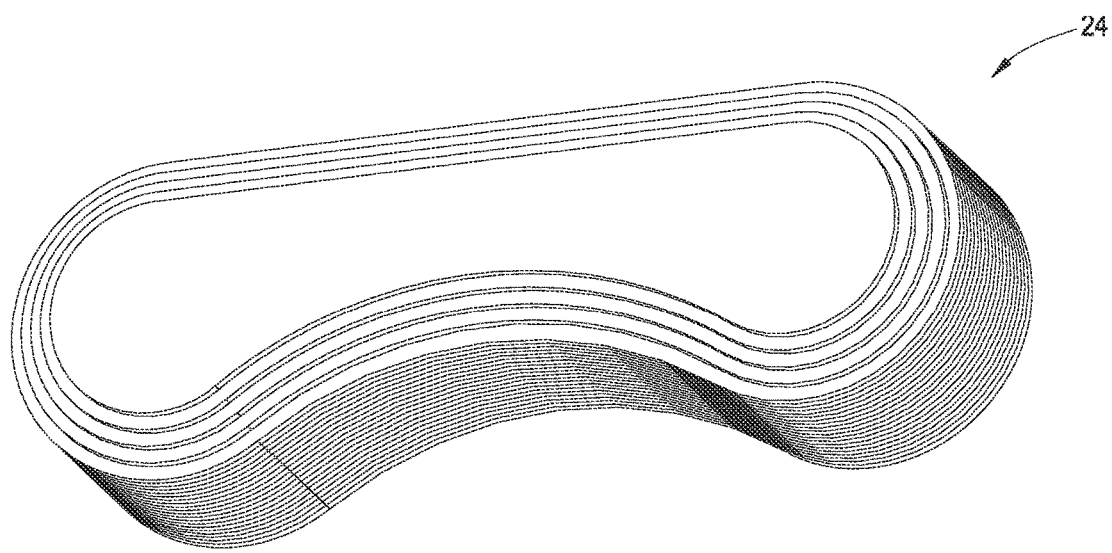
FIG. 7A is a perspective view showing an outside of an exemplary part, such as a mold, configured to be formed in an additive manufacturing process using the layers of FIGS. 3A-3C, according to some aspects of the present disclosure.
Figure 7B:
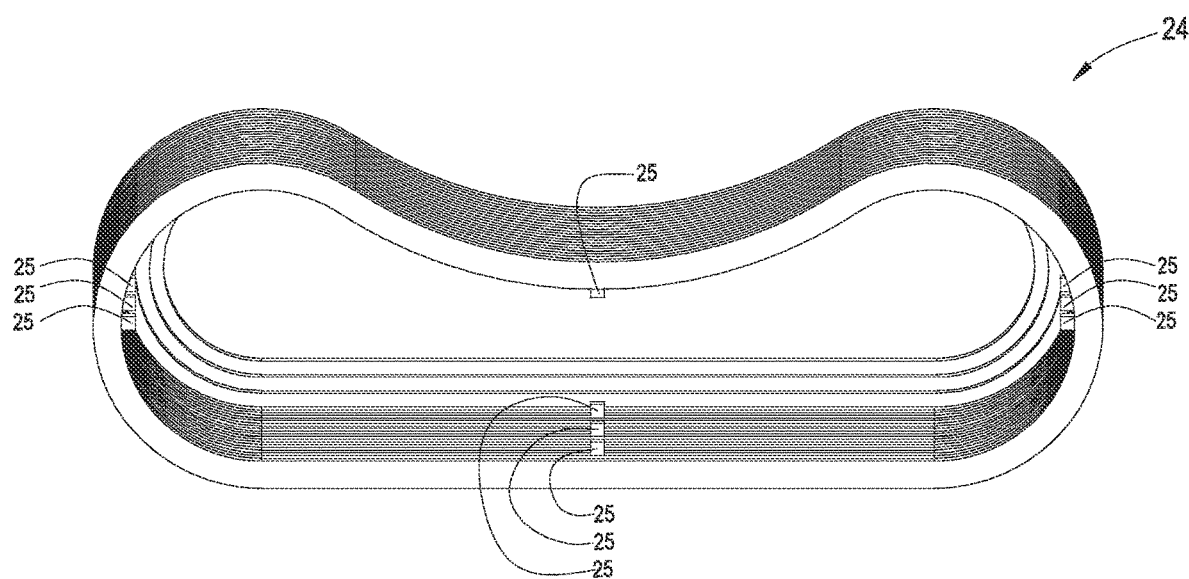
FIG. 7B is a perspective view showing an interior of the exemplary part shown in FIG. 7A.

FIG. 7A illustrates a part 24, such as a mold, formed by joining the above-described layer segments and layers together. For example, part 24 may be formed by connecting two or more segments to form a first layer (e.g., one of layers 13-15 in FIGS. 3A-3C), connecting two or more additional segments to form a second layer (e.g., another one of layers 13-15 in FIGS. 3A-3C), and connecting additional segments and layers until part 24 is fully assembled. FIG. 7A shows an outside view of part 24 from below, while FIG. 7B is a top perspective view that shows an inside (e.g., a hollow interior) of part 24 formed by the individual layers.

In at least some embodiments, cut layer manufacturing processes described herein may advantageously provide the ability to create anchor points 25, such as anchoring tabs, at any position on any layer (e.g., by interacting with a control system associated with cutting machine 11 and specifying a desired layer and/or location). FIG. 7B shows one example embodiment of anchor points 25, these anchor points protruding from inner walls of segments (e.g., segments of layers 13-15) that were connected to form part 24. These anchor points 25 may correspond to anchor points 25 as shown in FIGS. 3A-3C and may be configured to anchor an internal support structure.

Anchor points 25 may be at the approximate center or at the central portion of a particular segment. In some parts, anchor points 25 may be in the center or the central portion of the layer, as measured along the width or along the length of the layer (see, e.g., FIGS. 3B, 3C, and 7B). Additionally or alternatively, anchor points 25 may be located proximate to, or at, one or more ends of the segment (e.g., lateral ends of a longitudinally-extending segment, terminal ends of a C-shaped segment, etc.).

For at least some parts 24, the internal support structures described herein may be difficult to produce by 3D printing techniques. However, this is not necessarily the case for all embodiments, and anchor points 25 may be compatible with internal support structures that are formed by a separate 3D printing process. While anchor points 25 are shown as inwardly-protruding rectangular shapes in the Figures., other shapes are possible, such as trapezoids, other regular or irregular polygons, curved shapes, and others.

Figure 8A:
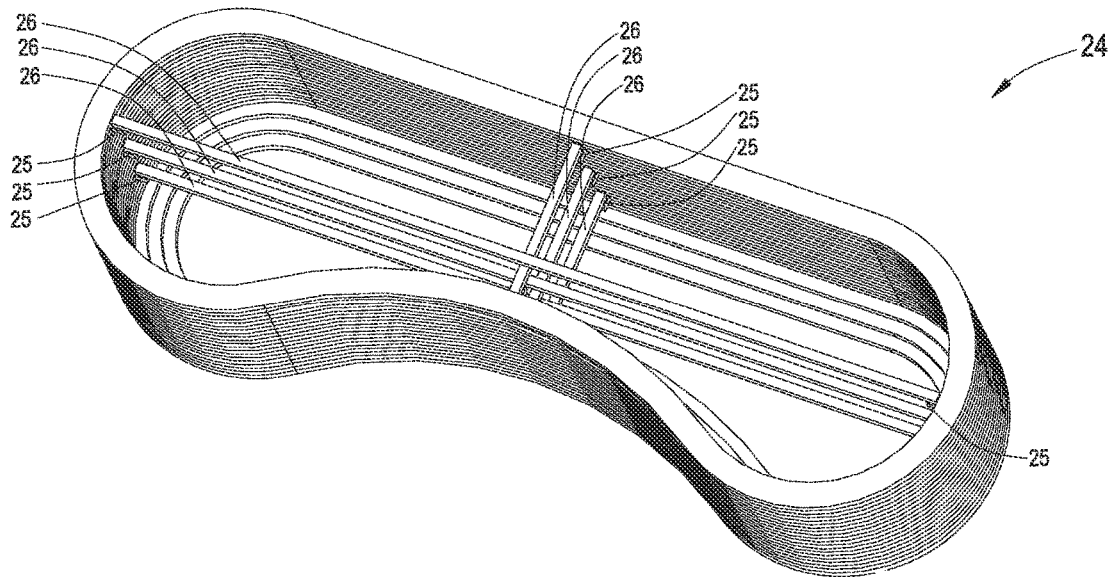
FIG. 8A is a perspective view of an inside of an exemplary part, such as a mold, with an internal support structure connected horizontally to anchor points, according to aspects of the present disclosure.
Figure 8B:
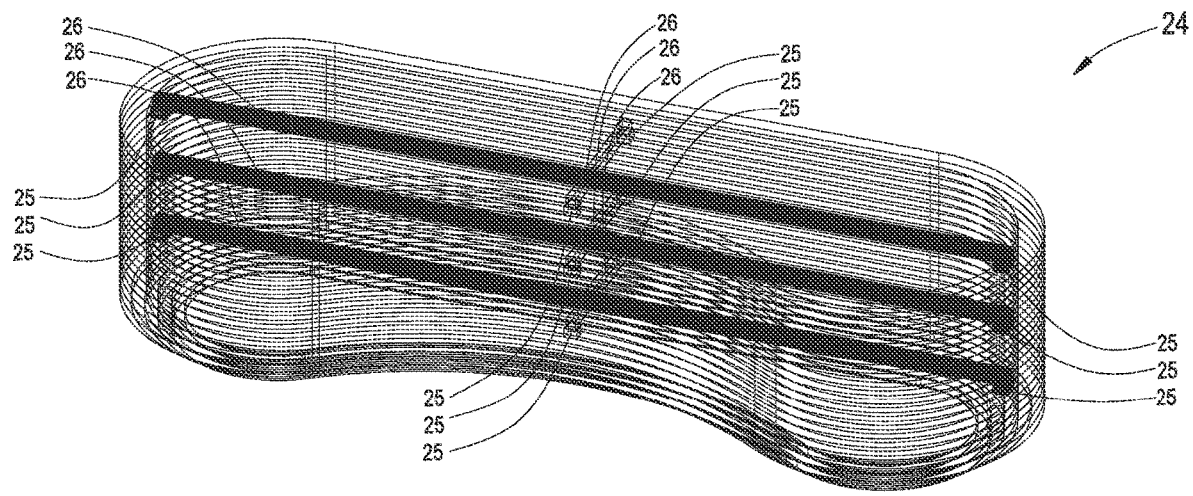
FIG. 8B is a wireframe view of the exemplary part, such as a mold, that corresponds to the part shown in FIG. 8A and illustrating an internal support structure connected horizontally to anchor points.

FIG. 8A is a top perspective view, and FIG. 8B is a side perspective wireframe view, each showing rods or beams that each form examples of an internal support structure 26. Support structure 26 may be fixed to and integrated with an interior of part 24, and in particular, anchor points 25. Each internal support structure 26 may have a rectangular cross-sectional shape as shown in FIGS. 8A and 8B, but could have other shapes, especially shapes with a flat surface that interfaces with a mating surface of a respective anchor point 25.

Support structure 26 may include a pair of opposed ends, each end being connected to a respective anchor point 25, allowing support structure 26 to extend horizontally within an interior of part 24 in a manner that, in at least some embodiments, would be challenging or impossible to form on a particular layer by use of 3D printing (even if the rods, beams, or other structure 26 are themselves formed by 3D printing). In the example shown in FIG. 8A, for example, support structures 26 could not be readily 3D printed without the use of additional vertical support structures.

Support structure 26 may span a single layer, such that each individual structure 26 connects a first anchor point 25 of a particular layer to a second anchor point 25 of the same, single layer. Internal support structure 26, whether formed as rods, beams, and/or other shapes, may be made of the same material as the remainder of part 24, or a different material. In some embodiments, support structure 26 may have been formed of a material having properties that are different from those of the layers of part 24 (e.g., layers 13, 14, and/or 15). In particular, support structure 26 may be made of a material that is lighter (e.g., less dense), heavier (e.g., more dense), more rigid, or stronger, than the material of the layers of part 24. In some aspects, layers 13, 14, and 15 may be porous, while support structure 26 is non-porous, or layers 13, 14, and 15 may be non-porous, while support structure 26 is porous.

In at least some embodiments, part 24 may be produced without the need to use 3D printing to form a wall (or any wall), a layer (or any layer) of part 24. Rather, part 24 may be formed with machine 11 as described above, in which, for example, the only portion formed by 3D printing is support structure 26. In some embodiments, a part 24 formed in this manner, without 3D printing, may include internal structure 26, which makes the entire part 24 (e.g., a mold) lighter and/or more rigid in comparison to a 3D printed part. Further, while exemplary shapes or forms are shown in FIGS. 1-9B, other shapes or forms are within the scope of this disclosure.

Anchor points 25 may be connected to support structure 26 in various methods. For example, puzzle joints, adhesive, fasteners, and others may be used, including the structures described above with respect to FIGS. 4-6. If desired, adhesive may be used instead of, or in addition to, the above-described structures. Additionally, support structure 26 may be placed directly on top of (e.g., stacked on) anchor points 25, as shown in FIGS. 8A and 8B. In other examples, support structures 26 may be attached at a lateral side of anchor points 25 (see FIGS. 9A and 9B), underneath one or both anchor points 25, or at ends facing the interior of part 24.

Figure 9A:
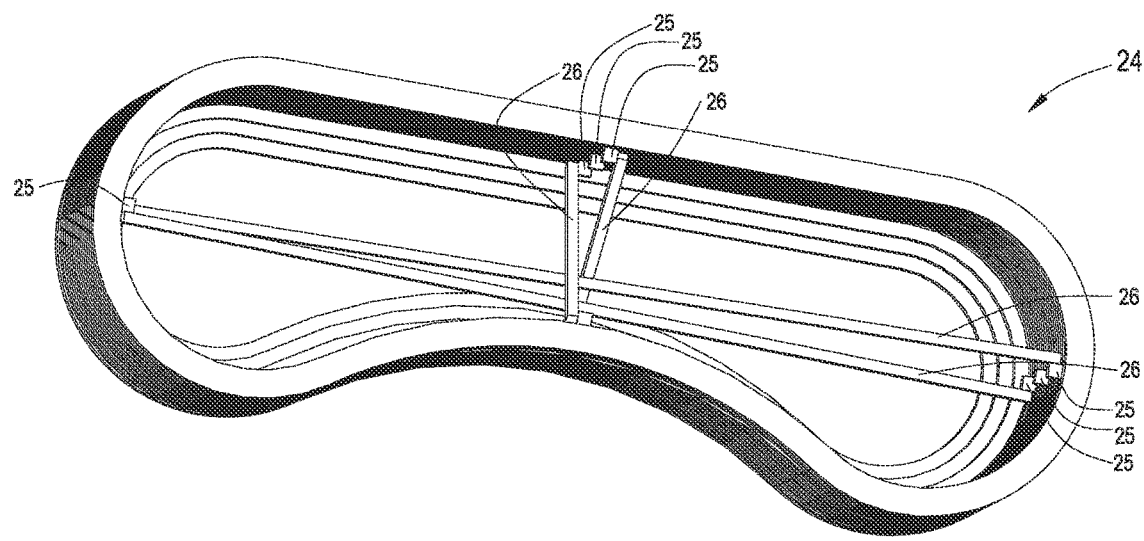
FIG. 9A is a perspective view of an interior of an exemplary part, such as a mold, with internal support structures analogous to those shown in FIGS. 8A and 8B, connected to anchor points in a crossing pattern.
Figure 9B:
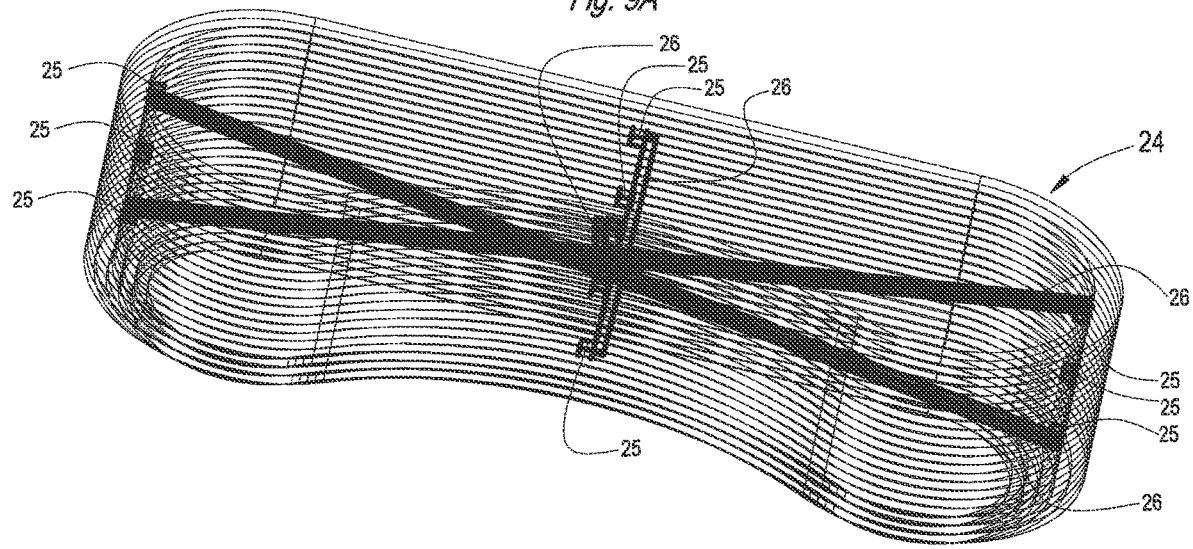
FIG. 9B is a perspective wireframe view of an part, such as a mold, shown in FIG. 9A, illustrating an internal support structure connected in a crossing pattern.

FIG. 9A and FIG. 9B illustrate an additional example of using the above-described internal support structure 26 (e.g., rods and/or beams) connected to anchor points 25. In particular, each rod or other structure forming support structure 26 may cross from one internal side of part 24 to an opposite internal side.

If desired, members of support structure 26 may be joined in a central portion, or at a mid-point, to provide additional reinforcement of part 24. For example, two or more support structures 26 may cross each other in a manner that causes these structures 26 to directly contact each other within the interior of part 24. One or more of the structures 26 may extend across a plurality of layers (e.g., to connect two layers that are stacked on top of each other at different heights). Also, as shown in FIGS. 9A and 9B, at least some support structures 26 may span a first number of stacked layers, and contact other support structures that span a second number of stacked layers (e.g., more layers or fewer layers). If desired, support structures 26 may indirectly contact each other by providing an additional support that extends from a pair of structures 26 without directly contacting an anchor point 25.

The above-described approach of incorporating anchor points 25 may be a feature for example, of software or other programming of controller 50. This may allow the addition of anchor points 25 to the design of a part in a fully automated manner or in response to a user's request for the addition of support structures 26. However, in some embodiments, anchor points 25 and/or support structures 26 may be included in the design of the part that is provided to controller 50.

The use of anchor points may facilitate desirable aspects of cut layer approaches to additive manufacturing. In addition, the disclosed approaches may offer a relatively easy to implement and flexible method for adding internal structures to cut layer parts, in particular hollow cut layer parts, allowing the use of materials that are relatively low-cost, more rigid, and/or lighter-weight, while retaining other characteristics that might be desirable when compared to those of than the material from which the layer itself (e.g., which forms a shell of part 24) is fabricated.

Figure 10:
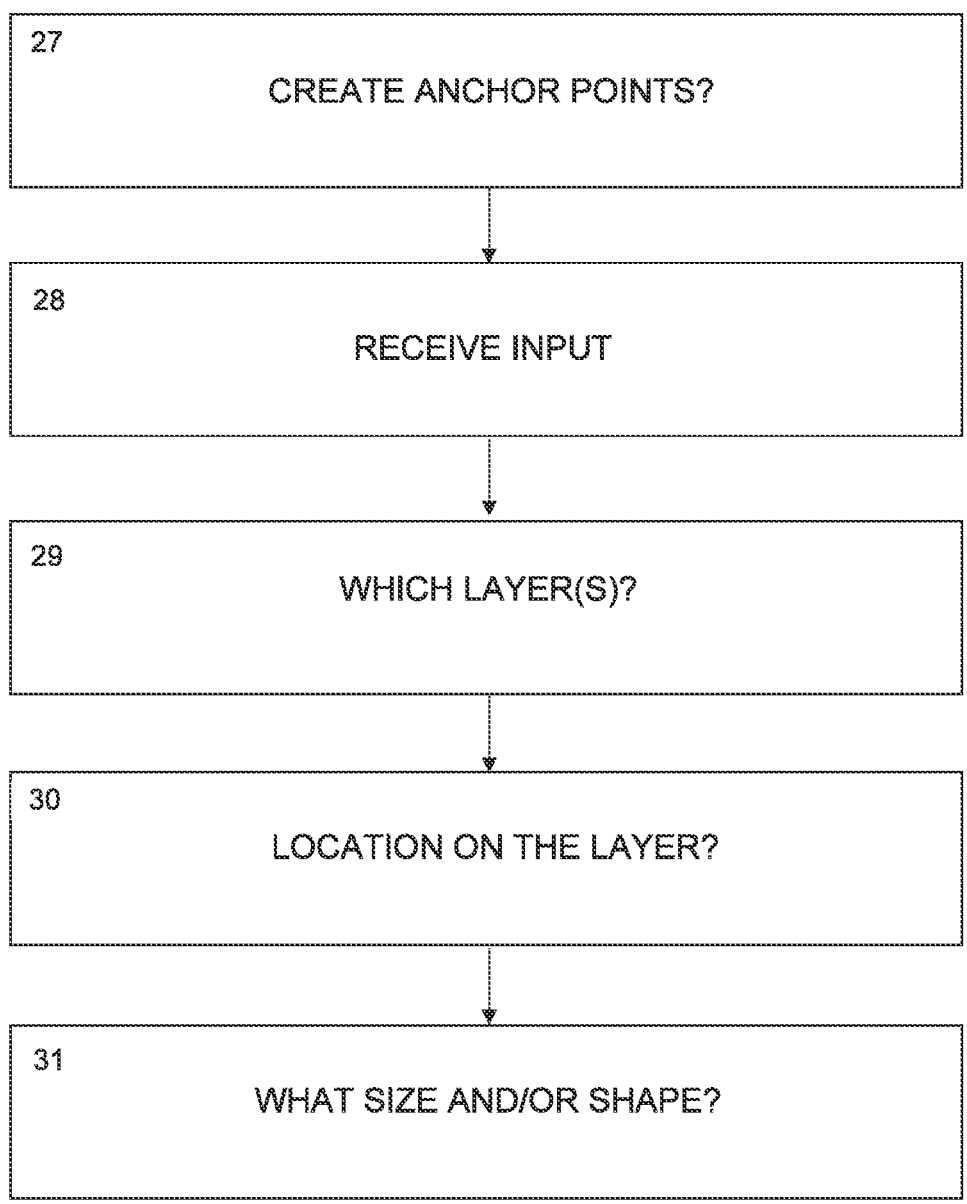
FIG. 10 is a flowchart of a method for adding anchor points, according to aspects of the present disclosure.

Anchor points 25 may be generated with the use of a control system, such as controller 50, in an automated process, a guided process, and/or an interactive process. For example, anchor points 25 may be added via an option or other function programed in cut layer software associated with controller 50, in a process that may be performed in a manner similar to that of adding dowel holes or other structures in the part. This may be performed, for example, during method 40, as described with reference to FIG. 10. Method 40 may be a computer-implemented method performed with controller 50, cutting machine 11, and/or other systems configured to control movements of machine 11. Prior to performing the steps 27-31 of method 40, which are described below, a computer model or other electronic representation of part 24 may be uploaded, opened, or otherwise provided to controller 50.

In a step 27 of method 40, the software or other programming of controller 50 may prompt a user to create one or more anchor points 25 (e.g., by presenting a notification or request on a display associated with machine 11). When it is desirable to add new or additional anchor points 25, the operator may provide an input that is received with controller 50 during a step 28. Step 28 may include receiving an input, e.g., in the form of "YES," by interacting with an input device such as a touchscreen or physical actuator (e.g., a button, switch, keyboard, mouse, etc.). While steps 27 and 28 may be performed manually, controller 50 may be configured to determine that anchor points 25 are desirable, with minimal user interaction or no user interaction. For example, controller 50 may determine that anchor points 25 are desirable based on an analysis of the geometry of part 24, and in response to this analysis, automatically add anchor points 25 to the design (e.g., electronic model or instructions) of part 24. Additionally or alternatively, controller 50 may recommend or suggest the inclusion of anchor points 25 to a user, e.g., by displaying a prompt on a display associated with controller 50, or may display a prompt that allows a user to add or remove anchor points 25 without displaying a recommendation.

In some aspects, once controller 50 determines that anchor points 25 will be created, controller 50 may perform a step 29 to determine which layers will include anchor points 25 and/or support structure 26. This determination may be made automatically, or by prompting a user to select one or more layers that will include anchor points 25 and support structures 26. When anchor points 25 are automatically generated, the layers that will include anchor points 25 may be identified based on areas of part 24 that are expected to benefit from additional reinforcement, stiffness, etc. This may be performed by analyzing stresses or forces associated with the completed part 24.

A step 30 of method 40 may include determining the position or positions of a layer where anchor points 25 and support structure 26 will be located. This may be automatically generated by controller (e.g., based on an analysis of part 24) or may be by an operator. When automatically generated (e.g., by programming of controller 50), the locations may be selected based on areas of part 24 that are expected to benefit from additional reinforcement, stiffness, or other attributes, similar to step 29.

A step 31 of method 40 may include determining a size of anchor points 25 and support structure 26, a shape of anchor points 25 and support structure 26, or both. For example, the size and/or shape may be set by a user by interacting with an input device associated with controller 50. Alternatively, controller 50 may itself determine the size and shape of anchor points 25 and support structure 26 based on the shape of a layer where these structures will be formed, a wall thickness of the layer, or other considerations.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A computer-implemented additive manufacturing method, comprising:
   receiving an electronic representation of a part with a control system, the part having a plurality of layers;
   determining that anchoring structures will be formed in the part;
   identifying one or more layers of the part that will include the anchoring structures;
   determining locations for the anchoring structures within the one or more layers, each anchoring structure includes a protrusion that extends towards an interior of the layer and that is located within the layer;
   generating instructions for forming the one or more layers including anchoring structures with a cutting machine; and
   connecting a support structure to the anchoring structures.

2. The method of claim 1, further including, based on the instructions, removing material from one or more sheets to form one or more layers that include the anchoring structures.

3. The method of claim 1, further including determining at least one of a size or a shape of the anchoring structures from a plurality of different sizes or shapes.

4. The method of claim 1, further including displaying a prompt to a user for determining that the anchoring structures will be formed in one or more of the layers.

5. The method of claim 1, further including generating instructions for forming a plurality of segments for the one or more layers having anchoring structures.

6. The method of claim 1, further including generating instructions for forming a plurality of segments for the one or more layers having anchoring structures, wherein the anchoring structures are on inner walls of the segments.

7. The method of claim 1, further including:
   generating instructions for forming a plurality of segments for the one or more layers having anchoring structures, wherein the anchoring structures are on inner walls of the segments; and
   generating instructions for forming a joint at an interface between the segments.

8. The method of claim 1, further including:
   generating instructions for forming a plurality of segments for the one or more layers having anchoring structures; and
   connecting the plurality of segments to each other to form the one or more layers.

9. The method of claim 1, further including:
   generating instructions for forming a plurality of segments for the one or more layers having anchoring structures; and
   connecting the plurality of segments to each other to form the one or more layers, wherein after the two or more segments are connected, the one or more layers have a hollow interior and the anchoring structures protrude into the hollow interior.

10. The method of claim 1, further including determining at least one of a size or a shape of the support structure from a plurality of different sizes or shapes.

11. A computer-implemented additive manufacturing method, comprising:
   receiving an electronic representation of a part with a control system, the part having a plurality of layers;
   determining that anchoring structures will be formed in the part;
   identifying one or more layers of the part that will include the anchoring structures;
   determining locations for the anchoring structures within a layer, wherein the anchoring structures include protrusions that extend towards an interior of the layer and that are located within the layer;
   determining a location for a support structure within the layer, wherein the support structure is connected to the anchoring structures; and
   generating instructions for forming the layer including the anchoring structures for receiving the support structure with a cutting machine.

12. The method of claim 11, further including, based on the instructions, removing material from one or more sheets to form one or more layers including the layer that include the anchoring structures.

13. The method of claim 11, further including determining at least one of a size or a shape of the anchoring structures from a plurality of different sizes or shapes.

14. The method of claim 11, further including displaying a prompt to a user for determining that anchoring structures will be formed in one or more layers.

15. The method of claim 11, further including generating instructions for forming a plurality of segments for one or more layers having anchoring structures.

16. The method of claim 15, further including:
generating instructions for forming a plurality of segments for one or more layers having anchoring structures, wherein the anchoring structures are on inner walls of the segments.

17. The method of claim 11, further including:
generating instructions for forming a plurality of segments for one or more layers having anchoring structures, wherein the anchoring structures are on inner walls of the segments; and
generating instructions for forming a joint at an interface between the segments.

18. The method of claim 11, further including:
generating instructions for forming a plurality of segments for one or more layers having anchoring structures; and
connecting the plurality of segments to each other to form the one or more layers.

19. The method of claim 11, further including:
generating instructions for forming a plurality of segments for the one or more layers having anchoring structures; and
connecting the plurality of segments to each other to form the one or more layers, wherein after the two or more segments are connected, the one or more layers have a hollow interior and the anchoring structures protrude into the hollow interior.

20. The method of claim 11, further including determining at least one of a size or a shape of the support structure from a plurality of different sizes or shapes.

* * * * *